INVENTORS
KEVIN P. MURPHY
SABATINO R. ORFEO
WILLIAM J. CUNNINGHAM
BY Jay P. Friedenson
ATTORNEY

United States Patent Office 3,282,048
Patented Nov. 1, 1966

3,282,048
POWER FLUID
Kevin P. Murphy, Bernardsville, Sabatino R. Orfeo, Morris Plains, and William J. Cunningham, Rockaway, N.J., assignors to Allied Chemical Corporation, New York, N.Y., a corporation of New York
Filed June 4, 1965, Ser. No. 461,424
10 Claims. (Cl. 60—36)

This invention relates to a method for converting heat energy to mechanical energy, and more particularly is directed to the use of a novel working or power fluid, viz. 1-bromo-2,2,2-trifluoroethane ($CF_3CH_2Br$), to accomplish the same.

The method whereby heat energy, and particularly waste heat energy, is transformed into useful mechanical energy by vapor power (Rankine) cycles is well known. The basic method comprises causing a suitable working or power fluid to pass in heat exchange relationship with a source of heat of sufficient intensity to vaporize the fluid; utilizing the kinetic energy of the expanding vapors to perform work by passing them through a turbine, machine or other work producing device; condensing the vapors and pumping the condensed liquid back in heat exchange relationship with the heat source to complete the cycle. A number of variations on this basic method have been employed, some of which will be discussed more in detail hereinafter.

A variety of fluids have been tested in the past as power fluids, all of which, however suffer from any one or more of a number of serious drawbacks. For example, water or steam has been the most commercially utilized power fluid. The disadvantages of water or steam as a power fluid include those of high boiling point, high critical pressure and low density, all of which factors limit the power obtainable and result in the need for relatively large and bulky apparatus. Furthermore, steam is deficient in entropy relationships along its saturation line, showing a decreasing entropy with an increasing temperature, and condenses upon isentropic expansion. Accordingly, the use of a steam cycle requires superheating and resuperheating to prevent condensation and formation of liquid in the turbine or other work producing device, which in turn results in erosion, and loss of efficiency. Mercury is another example of a fluid which has been used as a power fluid; but the use of mercury in this capacity entails the disadvantages of high toxicity, high cost and also that of exhibiting unfavorable entropy changes along the saturation line.

A number of organic liquids have been tested for use as power fluids, but there has been no single fluid found which possesses all of the important properties of being thermally stable at elevated temperatures, non-corrosive to ordinary materials of construction and possession of a high Rankine cycle efficiency. Since, as a rule, the Rankine cycle efficiency increases with an increase in temperature; it is desirable that the power fluid exhibit a minimum of breakdown and a minimum of corrosive effect at its maximum efficient operating temperature. For this reason, liquids with low thermal stability and high corrosion rates, do not have much practical value as power fluids, notwithstanding other advantageous properties which they might possess, such as high inherent Rankine cycle efficiency. In U.S.P. 2,301,404 to Holmes, November 10, 1942, there are disclosed a number of compounds, containing carbon, chlorine and fluorine atoms, which are alleged to be non-corrosive to metals. Of the compounds specifically mentioned, trichloromonofluoromethane ($CCl_3F$), because of its high inherent Rankine efficiency, and trichlorotrifluoroethane ($CCl_2FCClF_2$), because of its relatively high thermal stability, would appear to have the most potential for use as power fluids. Unfortunately, however, neither of these fluids is of much practical value as power fluids, since the thermal stability of the former is relatively low and since the inherent Rankine efficiency of the latter is relatively low. The use of perfluorocyclobutane as a power fluid has been reported in U.S.P. 2,471,476 to Benning et al., May 31, 1949. Although perfluorocyclobutane is relatively stable it has a very low Rankine cycle efficiency and thus is impractical for use as a power fluid. Other substances tested by the art for use as power fluids, have never attained commercial significance for this purpose, because of such drawbacks as failure to exhibit a significantly high enough Rankine efficiency, low thermal stability, high corrosiveness, possession of unfavorable entropy changes along the saturation line, unfavorable critical properties, high toxicity, flammability, or from any combination of the above.

A need is thus indicated in the art for the provision of a power fluid possessing a high Rankine efficiency, good thermal stability and low corrosiveness, which does not possess, to a significant extent, various other disadvantageous properties encountered by the prior art.

It is accordingly an object of this invention to provide a power fluid which possesses a good combination of those physical, chemical and thermodynamic properties which are desirable in a working fluid for a Rankine-type power cycle.

It is another object of this invention to provide a power fluid possessing a high Rankine cycle efficiency, which power fluid does not suffer from the various disadvantages possessed by previously tested power fluids.

A more particular object of the invention is to provide a power fluid possessing a high Rankine cycle efficiency which combines the advantage of good thermal stability therewith.

Still a more specific object of the invention is to provide a power fluid possessing a high Rankine cycle efficiency which combines the advantages of good thermal stability and low corrosiveness therewith.

It is another object of the invention to provide a power fluid whose vapors do not condense during expansion at nearly constant entropy.

It is still another object of the invention to provide a power fluid which is substantially thermally stable at temperatures up to about 500° F.

Yet another object of the invention is to provide a power fluid with a low degree of corrosiveness to ordinary materials of apparatus construction at temperatures up to about 500° F.

A particular object of the invention is to provide a power fluid which is thermally stable and essentially non-corrosive to steel at temperatures up to about 350° F.

Other objects and advantages of the invention will become apparent from consideration of the following description, explanation, claims and drawings, in which drawings:

It has been found that the hereinbefore stated objects of the invention are accomplished when the compound 1-bromo-2,2,2-trifluoroethane ($CF_3CH_2Br$) is employed as power fluid in a Rankine-type cycle.

Figure 2:
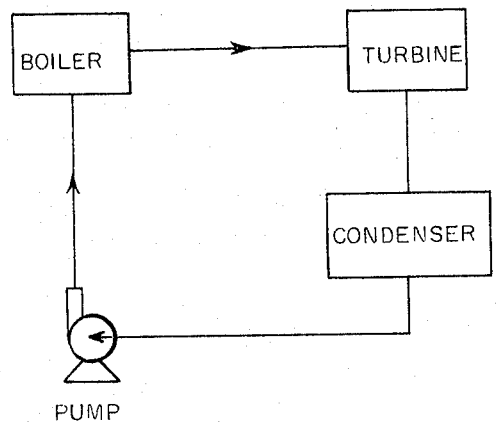
FIG. 2 is a diagram of a typical Rankine cycle.

In FIG. 2 there is shown, diagrammatically, the essential components and basic operation of the simple or standard Rankine-type cycle. In such a cycle, the power or working fluid is pumped into a boiler, or in other words, is pumped into heat exchange relationship with some heat source; the heat from the heat source vaporizes the power fluid and the vapors of the power fluid are then passed through a work producing device, such as a machine or turbine, in order to convert the kinetic energy of the expanding vapors into useful mechanical energy. The power fluid vapors are expanded isentropically, i.e., at constant entropy, and a portion of their energy is converted to useful work. The function of converting heat energy to mechanical energy has been fulfilled at this point; however, in order to reuse the power fluid, the cycle is completed by further cooling the vapors, which have passed through the work producing device, liquefying them at constant pressure, such as in a condenser, and then pumping the condensed liquid back to the boiler or heat source for reuse.

A number of variations may be made on the simple or standard Rankine cycle, hereinafter referred to as standard system, which may, in particular situations, increase the efficiency of the cycle; that is increase the amount of mechanical energy recovered relative to the amount of heat energy supplied, or which variations may provide operating advantages in a number of other respects. Use of $CF_3CH_2Br$ as a power fluid may be made in such variations, thus affording all the advantages provided by employing such variations, while also making use of the advantages provided by the use of $CF_3CH_2Br$ as power fluid.

On such variation which has, and can be employed, is what can be referred to as a regenerative system. In a regenerative system, the turbine exhaust, which may include superheat from the power cycle is used to raise the temperature of the power fluid after it leaves the condensers; so that when the power fluid passes in heat exchange relationship with the ultimate heat source, a greater proportion of the heat energy of the heat source is utilized to vaporize the fluid and provide expanding vapor force for driving the turbine or other work producing device, as compared with that proportion of the heat energy of the heat source, which is utilized for merely raising the temperature of the power fluid to the point at which additional heat will cause the desired vaporization. Thus, by such a system, the relative overall efficiency over the standard system may be increased. The regenerative system, however, requires the provision of an additional heat exchanger for the purpose of recovering and utilizing the superheat. The additional equipment, however, increases the expense and operating difficulties of the system and thus the obtainable increase in overall system efficiency is offset by these factors. Depending upon the circumstances, chiefly the amount of superheat in the turbine exhaust, there may or may not be a net gain in system efficiency. Generally, unless a superheated cycle is employed, as will be discussed hereinafter, the obtainable efficiency increase is not substantial.

Another well known variation of the standard system can be called a Binary system. In this system there are provided two standard systems employing two different power fluids. The fluid in the second system is subtantially more volatile than the fluid employed in the first system and the condenser for the first system is used as the boiler for the second system. Under some circumstances, this type of system affords certain operating advantages since higher temperatures may be employed in the system without the acompanying and disadvantageous use of corresponding high pressures. This system, however, requires an additional turbine and other duplication of equipment and its advantages are thus offset by these and other factors.

Still other variations on all of the standard, regenerative and binary systems may be made by modifying the thermodynamic state of the circulating liquids and vapors. For example, the power fluid in any of the above systems may be run in a saturated cycle in which the vapors are in equilibrium wtih the liquid. With a saturated cycle, the liquid is heated in order to accomplish vaporization, but the critical temperature of the liquid is not exceeded. The maximum temperature to which the liquid is raised is thus somewhere between the condenser temperature and the critical temperature of the liquid. When it is feasible to operate with a saturated cycle, superheating is not required. This obviates the need for use of high pressures and temperatures and permits lighter, more inexpensive equipment. It is obvious therefore that, provided a system with a high enough Rankine efficiency is afforded, use of saturated cycles are generally more desirable. For reasons described hereinbefore, however, it is not always possible to employ saturated cycles with previously known power fluids. Accordingly, the use of $CF_3CH_2Br$ in a saturated cycle constitutes a preferred embodiment of the invention.

Another cycle variation is the superheated cycle, in which after vaporization, the vapors are further heated at constant pressure and the superheated vapors are passed through the turbine. With such a cycle, a regenerative system must usually be employed to recover waste superheat and increase overall efficiency. Under some circumstances superheated cycles may be used to advantage and higher efficiencies obtained than would be the case with a corresponding saturated cycle. Mostly, however, superheated cycles are resorted to out of necessity, not choice. The disadvantages include those of use of more difficult operating conditions and need for more equipment. As will be apparent from the discussion above, one of the major advantages afforded by the use of $CF_3CH_2Br$ as a power fluid is that it is not necessary to resort to superheated cycles for its use.

Another cycle variation is the supercritical cycle. In this cycle, the pressure of the power fluid is raised above its critical pressure and the temperature of the power fluid is raised above its critical temperature. In some situations, it is possible to extract more power with a higher efficiency using a supercritical cycle, however, such is not obtained without accompanying disadvantages similar to those described for use of a superheated cycle, such as those of increased cost and weight of high temperature and high pressure equipment.

Application of the power fluid of the invention in such Rankine-type systems and cycles may be made for the purpose of utilizing heat energy, and particularly waste heat energy, which is available from a variety of sources which have been previously utilized as sources of heat energy for power cycles and, in addition, because of the high thermodynamic or Rankine cycle efficiency of $CF_3CH_2Br$, this fluid may be particularly advantageously used to recover and convert heat energy to mechanical energy from relatively low level heat sources, as well as from high level heat sources. Typical heat sources which may be taken advantage of include, but are not limited to the following: hot stack gases from industrial processes, exothermic heat from various chemical reactions, natural thermal wells, gas turbine exhausts and internal combustion machines.

The power fluid of the invention also possesses good heat transfer properties and other characteristics, which make it useful as a refrigerant, and therefore is especially suited for use in the split cycle type refrigeration systems, in which the fluid serves both as a refrigerant and as a power fluid, which in its latter capacity, powers the compressor and other components.

Some specific applications which may be mentioned as being exemplary for use of the subject power fluid include: the utilization of energy from turbine exhaust gases to drive an auxiliary turbine; the recovery of heat in a variety of chemical synthesis plants and its conversion to mechanical energy to operate various auxiliary equipment and the recovery of waste heat from pumps, fluid motors, turbines and expanders, which is converted to power which may be used to drive centrifugal, screw or rotary pumps, compressors, blowers, and electric generators. As an illustration of a split cycle refrigeration system application, the power fluid of the invention may be used in refrigerated motor vehicles and the like, wherein the waste heat from the vehicles' internal combustion engines, or other sources, can be used as a source of energy for driving or assisting in the driving of a compressor for the refrigeration system.

A variety of other applications will readily occur to those skilled in the art.

$CF_3CH_2Br$, the power fluid of the invention, is a well known compound; it can be prepared economically by well known methods and it is commercially available. Some of the physical and chemical properties of $CF_3CH_2Br$ are listed in the following table:

Table I
PROPERTIES OF $CF_3CH_2Br$ (a) Critical temperature: $T_c = 364.9°$ F.
(b) Critical pressure: $P_c = 578.2$ p.s.i.a.
(c) Critical density: $D_c = 39.15$ lb./ft.$^3$
(d) Liquid density at 80° F.: 110.4 lb./ft.$^3$
(e) Boiling point: 80.2° F.
(f) Freezing Point: Below about −50° F.
(g) Specific heat: 0.201 B.t.u./lb. at 80° F.
(h) Heat of vaporization: 70.13 B.t.u./lb. at 86° F.
(i) Flammability: Non-flammable Significantly, the Rankine cycle efficiencies for $$CF_3CH_2Br$$

are very high. A sampling of the same at various boiler and condenser temperatures is shown in the following table:

Table II
DEAL RANKINE CYCLE EFFICIENCIES FOR $CF_3CH_2Br$ (ISENTROPIC EXPANSION)

| Boiler Temp., ° F. | Condenser Temp., ° F. | Work Out B.t.u./lb. | Heat In B.t.u./lb. | Percent Efficiency |
|---|---|---|---|---|
| 250 | 80 | 20.4 | 92.6 | 22.0 |
| 270 | 80 | 22.0 | 94.7 | 23.2 |
| 300 | 80 | 24.5 | 97.7 | 25.1 |
| 320 | 80 | 25.3 | 98.7 | 25.6 |
| 340 | 80 | 26.7 | 99.2 | 26.9 |
| 360 | 80 | 27.3 | 97.7 | 27.9 |
| 250 | 120 | 14.4 | 83.9 | 17.2 |
| 270 | 120 | 16.0 | 87.0 | 18.4 |
| 300 | 120 | 18.5 | 89.0 | 20.8 |
| 320 | 120 | 19.5 | 90.0 | 21.7 |
| 340 | 120 | 20.5 | 90.5 | 22.7 |
| 360 | 120 | 21.5 | 89.0 | 24.2 |

Figure 1:
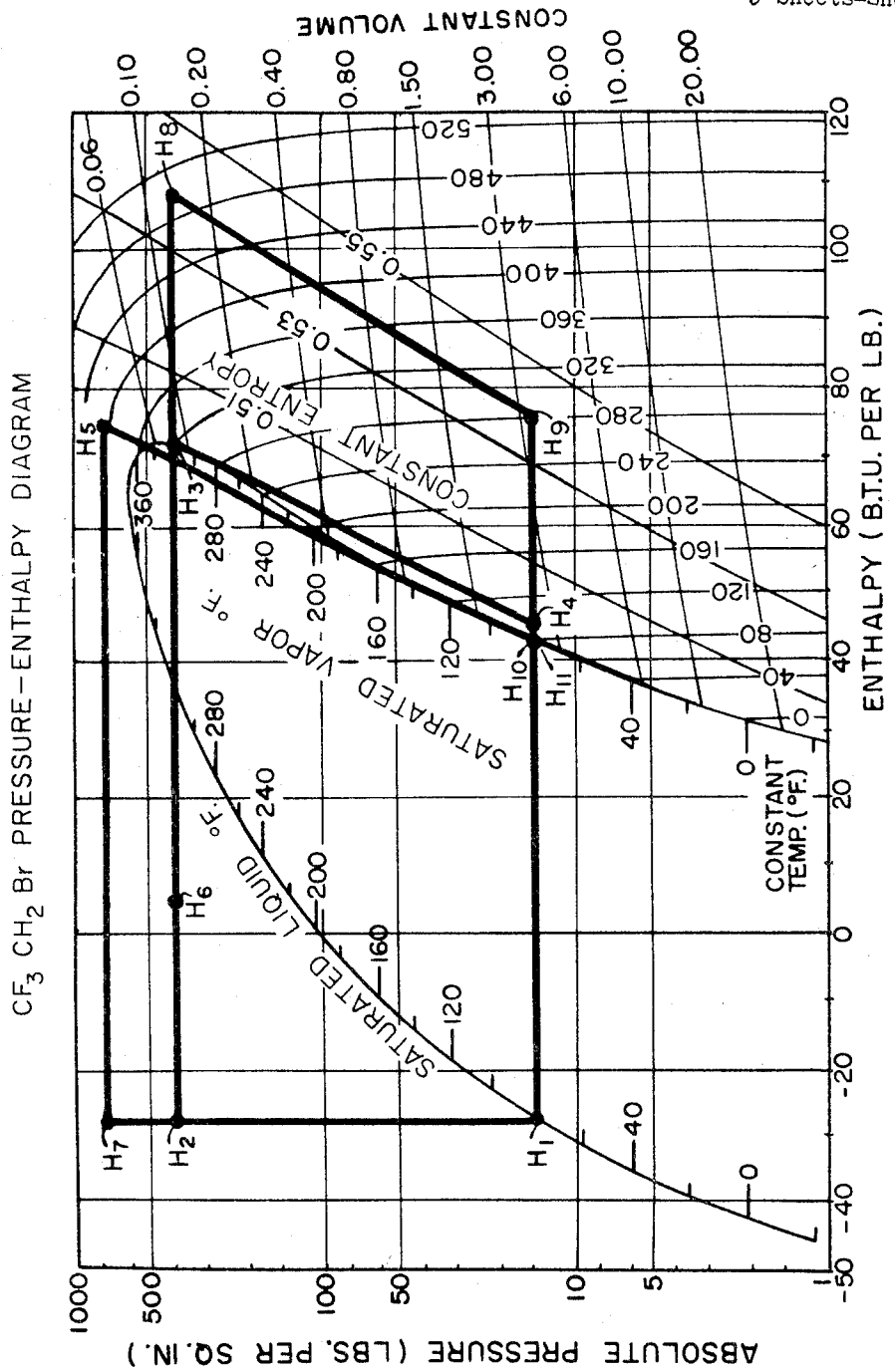
FIG. 1 is a pressure-enthalpy thermodynamic chart for the compound 1-bromo-2,2,2-trifluoroethane showing certain hereinafter defined power cycles traced thereon.

The "Work Out" and "Heat In" values used in above Table II were taken from the pressure-enthalpy chart of FIG. 1.

Figure 4:
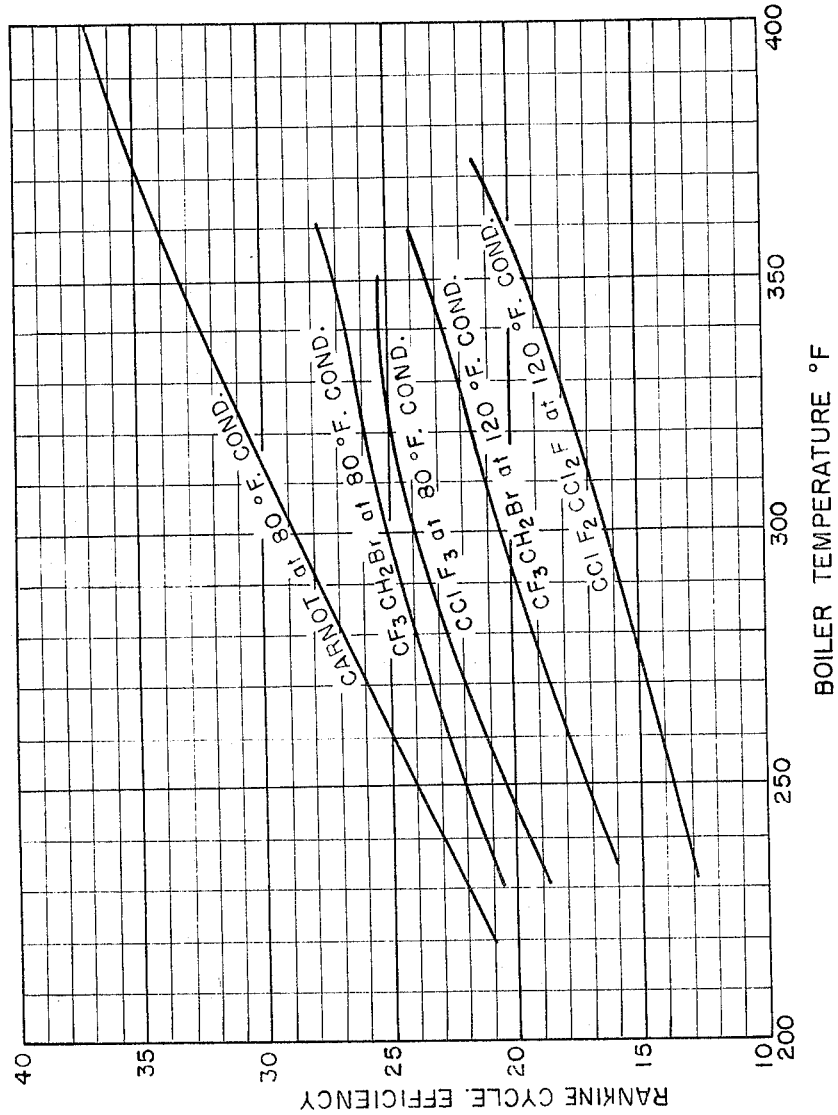
FIG. 4 is a graph showing the comparative Rankine cycle efficiencies of the power fluid of the invention and two other halocarbons, at two different condenser temperatures.

The ideal Rankine cycle efficiencies for $CF_3CH_2Br$ at 80° F. and 120° F. condensing temperature are plotted as a function of boiler temperature in FIG. 4. For comparative purposes, the corresponding plots for $CClF_3$ and $CClF_2CCl_2F$, two other halocarbons which have been tested as power fluids, and the plot for the ideal Carnot cycle at 80° F. condensing temperature, are shown on the graph. For purposes of illustration, the ploted values (and corresponding table values) for Rankine cycle and Carnot cycle efficiencies were based on the assumption of isentropic expansion and hence are referred to as "ideal" cycle efficiencies. Practically, only about 80% of isentropic expansion is obtainable, however, the given values are useful for comparing the relative efficiencies involved Actual efficiencies, based on feasibly obtainable 80% of isentropic expansion, would not vary more than about 15–20% lower than the values based on (100%) isentropic expansion. The Carnot cycle efficiencies, which are the theoretical maximum for heat engines, were computed by the following formula:

Carnot cycle efficiency =

$$\frac{\text{Boiler } T \text{ (° R.)}}{\text{Boiler } T \text{ (° R.)} - \text{condenser } T \text{ (° R.)}}$$

wherein ° R is degrees on the Rankine scale (° Fahrenheit + 460° = ° Rankine).

The thermal stability of $CF_3CH_2Br$, alone and in the presence of ordinary carbon steel, was evaluated by the following test procedure: Each of three samples of $CF_3CH_2Br$ were distilled into three glass ampules, one of which was empty and the other two containing test rods of ordinary steel. The ampules were then frozen in liquid nitrogen and the necks sealed by melting the glass. One of the ampules containing a steel test rod and the ampule containing no test rod were heated to 500° F. in an oven and maintained at that temperature for three months. The remaining ampule containing the steel test rod was heated to 350° F. and maintained at that temperature for three months. At the end of the three month period, the $CF_3CH_2Br$ samples were removed by breaking the glass ampules and were analyzed by gas chromatography. In addition, the steel test rods were weighed to determine weight loss, as a measure of corrosion. The 350° F. test with the steel test rod showed no decomposition of $CF_3CH_2Br$ and only a negligible weight loss of the steel rod. The 500° F. test without the steel test rod showed no decomposition. The 500° F. test with the steel test rod showed about 3% decomposition. Corrosion of the steel rod was noticeable but not excessive.

The above-described thermal stability tests indicate that $CF_3CH_2Br$ is well suited for use at temperatures up to about 350° F. in the presence of ordinary carbon steel. The use of ordinary steel is, of course, a factor of major importance in reducing the capital costs of the heat recovery system. Moreover, since the highest practical temperature for saturated cycles using this fluid is around 350° F.; no limitations on system temperature need be imposed because of any limitation on thermal stability. It should further be observed that the tests indicate that use of $CF_3CH_2Br$ in the presence of steel even at temperatures up to 500° F. is feasible. Also, since $CF_3CH_2Br$ does not decompose at temperatures of at least about 500° F.; it is apparent that $CF_3CH_2Br$ can be used effectively in superheated and supercritical cycles by merely providing, for the apparatus construction material, some material with a sufficiently higher corrosion resistance than ordinary steel.

As regards the efficiency of a power fluid in a given cycle or system; the ideal (i.e., assuming isentropic expansion) Rankine cycle efficiency for a given fluid under specific operating conditions is given by the following relationship:

$$\text{Efficiency} = \frac{\text{turbine output}}{\text{heat supplied}} \quad \text{(I)}$$

The feed pump work, which detracts from the turbine output and thus lowers the Rankine efficiency, is normally relatively small and can be neglected for the purpose of this illustration. The turbine output is the work accomplished and, for the present purpose, will be referred to as the relationship: $H_I - H_E$, wherein $H_I$ is the enthalpy content (B.t.u. per lb.) of the gas at the turbine inlet and $H_E$ is the enthalpy content (B.t.u. per lb.) of the gas at the turbine exit. The heat supplied is the total heat added to the power fluid and, for the present purpose, will be referred to as the relationship: $H_I - H_C$, wherein $H_I$ is as defined above and $H_C$ is the enthalpy content (B.t.u. per lb.) of the liquid as it exists the condenser. From the Equation I, the ideal Rankine cycle efficiency (E) can be expressed by:

$$E = \frac{H_I - H_E}{H_I - H_C} \quad \text{(II)}$$

The various enthalpy values in the above equation may be read from the pressure-enthalpy diagram of FIG. 1. In FIG. 1, for example, the turbine inlet enthalpy ($H_I$) can be read from the chart at the point designated by the known inlet pressure, indicated on the vertical axis, and the temperature of the vapors, indicated on the temperature scale along the saturated vapor line. From this inlet pressure-temperature point ($H_I$), the line of constant entropy can be followed to the condenser pressure and the exhaust enthalpy ($H_E$) may be read at this point. (It should be noted that such enthalpies, so determined, are valid even if the path followed is in the superheated region of the diagram, i.e. to the right of the saturated vapor line.) The change in enthalpy between inlet and exhaust ($H_I - H_E$), when multiplied by 0.0236 times the flow in pounds per minute, gives the theoretical horsepower available.

Figure 3:
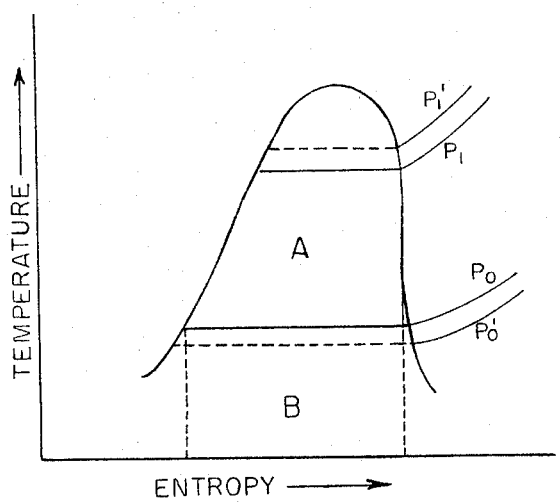
FIG. 3 is a generalized temperature-entropy diagram illustrating the effect of boiler and condenser temperature on Rankine cycle efficiency.

Factors affecting the Rankine cycle efficiency may be appreciated from a consideration of the temperature-entropy diagram of FIG. 3. In this figure, the Rankine cycle efficiency is shown graphically by the ratio of the area A to the area of A plus the area of B. It is obvious that any factor which increases the area of A, with respect to the area of A plus the area of B, will increase the cycle efficiency. Thus, the result of raising the boiler pressure (increasing the temperature) from $P_1$ to $P_1'$ is to increase the area of A relative to the area of A plus B, and thus give a higher efficiency. The upper limits of usable boiler pressures and temperatures are determined by the mechanical limitations of the apparatus and by the thermal stability of the working fluid employed. It is also clear that the result of lowering the condenser pressure from $P_0$ to $P_0'$, is also to increase the area of A relative to the area of A plus B and thus give a higher efficiency. The lower limits of usable condenser pressures and temperatures are determined by the capability of the heat sink which is employed, i.e. either the temperature of the atmosphere, in the case of air-cooled apparatus, or the temperature of the water, in the case of water-cooled apparatus. In addition, as it is desirable to keep a positive pressure throughout the system and to avoid having a vacuum on the condenser, the lower limits of condenser pressures and temperatures are practically influenced by the normal boiling point of the working fluid employed.

Following Table III gives a comparison of Rankine cycle efficiencies for various prior art fluids and the subject $CF_3CH_2Br$ fluid. The figures are based upon 100% turbine efficiency and, as pointed out hereinbefore, are not accurate absolute values but are accurate for the purposes of showing relative efficiency values. The Rankine cycle efficiencies are also expressed as percentages of the Carnot cycle efficiency which is the maximum theoretical efficiency for any heat engine. The Carnot cycle efficiency, between 300° F. and 80° F., was calculated to be 29.0% by the formula given hereinbefore and following Table III compares the Rankine cycle efficiencies for various fluids against this value.

*Table III*

COMPARISON OF RANKINE CYCLE EFFICIENCIES FOR VARIOUS FLUIDS

| Cycle, 300° F. to 80° F. | Rankine Efficiency, Percent | Percent of Carnot Efficiency (29.0%) |
|---|---|---|
| $CF_3CH_2Br$ | 25.1 | 86 |
| $CCl_3F$ | 24.0 | 83 |
| $CCl_2FCClF_2$ | 20.4 | 70 |
| $C_2F_4Cl_2$ | 19.5 | 67 |
| Cyclo-$C_4F_8$ | 16.7 | 58 |

Since the Rankine cycle efficiency must always be below that of the maximum theoretical efficiency of the Carnot cycle; it can be seen that there is a definite upper limit to the Rankine cycle efficiencies which can be obtained. As indicated in the table, $CF_3CH_2Br$ has a Rankine efficiency of 25.1% or 86% of the theoretical Carnot maximum. The corresponding Rankine efficiency for $CCl_2FCClF_2$, for example, the next highest fluid listed in Rankine efficiency which possesses a reasonable degree of thermal stability, is 20.4% or 4.7% less than the Rankine cycle efficiency of $CF_3CH_2Br$. This means that 4.7/25.1=approximately 18.7% more power is obtainable from a system employing $CF_3CH_2Br$ as compared with a system employing $CCl_2FCClF_2$.

Determination of those temperature and pressure conditions which will be employed in a power cycle using $CF_3CH_2Br$ as working fluid will depend upon the intensity of the available heat source and upon the particular system and cycle desired. Several illustrative embodiments will be described together with an explanation of design procedures which may be used for optimizing the useful work and efficiencies obtainable.

As discussed heretofore, a preferred embodiment of the invention lies in use of a saturated cycle on a standard system. 350° F. is about the maximum feasible allowable temperature in such a system. If the intensity of the available heat source is too high, it must of course be adjusted. In such a system the design object is to so control the operating conditions of temperature and pressure that after expansion of the gas, the vapors are just saturated, or in other words, so that the vapors are not superheated, or at least so that the vapors do not possess an appreciable degree of superheat. This is accomplished by simply pumping the power fluid to a pressure sufficient to overcome the pressure in the boiler. The pressure required to accomplish this may be read directly from the verical pressure axis of the thermodynamic chart of FIG. 1, opposite the boiler temperature, as shown on the temperature scale of the saturated liquid (or saturated vapor) line.

A typical working standard system, utilizing $CF_3CH_2Br$ in a saturated cycle, comprises heating the power fluid to a temperature of 320° F. in the boiler. From the vertical pressure axis of the pressure-enthalpy chart of FIG. 1, it can be seen that the required pressure to which the fluid must be pumped in order to overcome the boiler pressure at that temperature is 390 p.s.i.a. The enthalpy of the liquid entering the pump will be designated as $H_1$ and in this case equals $-27.2$ B.t.u./lb. $H_2$ represents the enthalpy of the liquid as it exits the pump and is essentially equivalent to $H_1$. The energy requirements for pumping the liquid are relatively small, have little effect on the theoretical cycle efficiency and will be disregarded in subsequent cycle efficiency calculations. The power fluid is then heated to 320° F. in the boiler or heat exchanger. The power fluid vaporizes in the boiler and the vapors are led to the turbine. The enthalpy of the vapor at 320° F. and 390 p.s.i.a., as it enters the turbine, will be designated as $H_3$, which in this case equals 71.5 B.t.u./lb. After expansion through the turbine, the vapors, at the exit of the turbine, have a temperature of 100° F. and anthalpy $H_4$ of 46.2 B.t.u./lb. The expanded vapors exert a pressure of 14.5 p.s.i.a. in the condenser at 80° F. condensing temperature. After cooling and liquefication in the condenser, the condensed liquid is returned to the pump and recycled to the boiler or heat exchanger. The above-described saturated cycle is traced on the pressure-enthalpy chart of FIG. 1 by the lines which connect enthalpy points: $H_1$-$H_2$-$H_3$-$H_4$-$H_1$. Calculation of the efficiency of the above-described cycle may be made by substituting the appropriate values in Equation II, supra, as follows:

$$\frac{H_3 - H_4}{H_3 - H_1} = \frac{71.5 - 46.2}{71.5 - (-27.2)} \times 100 = 25.6\%$$

If a superheated cycle is desired, a regenerative system can be employed to make use of the excess superheat and the pressure to which the fluid should be pumped, for a given boiler temperature, is determined in the same manner as described above for the saturated cycle.

A typical working regenerative system, utilizing $CF_3$-$CH_2Br$ in a superheated cycle, comprises pumping the power fluid, for example which may be at 80° F., 14.6 p.s.i.a. (enthalpy—$H_1$=27.2 B.t.u./lb.), to a pressure of 390 p.s.i.a. (enthalpy—$H_2 \sim H_1$) and heating the fluid to 320° F. (enthalpy—$H_3$=71.5 B.t.u./lb.) to cause vaporization. The vapors are then superheated by heating, at constant pressure, to 500° F., at which temperature they are passed into the turbine. The enthalpy of the vapors entering the turbine will be designated as $H_8$ and is 109.0 B.t.u./lb. The vapors are then expanded isentropically through the turbine to 14.5 p.s.i.a and then are cooled to 80° F. The vapors exit the turbine at 280° F. and possess an enthalpy of 76.0 B.t.u./lb., designated as $H_9$. Upon exiting the turbine the vapors are caused to enter a heat exchanger countercurrent to the boiler feed liquid in which the vapors are cooled to 80° F., 14.5 p.s.i.a. The vapors exiting the heat exchanger have an enthalpy content of 43.2 B.t.u./lb., which will be designated as $H_{10}$. Thus, it is seen that during cooling in the heat changer, the vapors give up 76.0 ($H_9$)—43.2 ($H_{10}$)=32.8 B.t.u./lb., which is the heat available to heat the liquid from $H_2$ to $H_6$, thus making use of the superheat to help raise the temperature of the liquid to the point at which it can be vaporized and superheated. $H_2$ has been defined previously. $H_6$ is shown on the pressure-enthalpy chart of FIG. 1 and represents the enthalpy of the liquid which exits the above-described heat exchanger in the regenerative portion of the cycle. The complete cycle is traced on the pressure-enthalpy chart of FIG. 1 by the lines which connect enthalpy points: $H_1$–$H_2$–$H_6$–$H_3$–$H_8$–$H_9$–$H_{11}$–$H_1$. Calculation of the efficiency of the above-described cycle may be made by substituting the appropriate values in Equation II, supra, as follows:

$$\frac{H_8-H_9}{H_8-H_1-(H_9-H_{10})} = \frac{109.0-76.0}{109.0+27.2-(32.8)}$$

$$= \frac{33.0}{103.4} = 31.9\%$$

If a supercritical system is desired, the following procedure should be carried out to determine those conditions of temperature and pressure over the critical temperature and pressure of the fluid which are required to give maximum operating efficiency. First, that constant entropy line is selected, on the pressure-enthalpy chart of FIG. 1, which will intersect the saturated vapor line at the condenser pressure employed. The point at which the condenser pressure line (14.5 p.s.i.a.) intersects the saturated vapor line is designated by $H_{10}$ or $H_{11}$, which substantially coincide at this point. The entropy line which intersects this point is shown in FIG. 1 by the line connecting points $H_5$–$H_{11}$ which, for the purpose of this discussion, will hereinafter be referred to as the optimal entropy line (OEL). It will be observed that the OEL is a true entropy line and does not precisely coincide with the saturated vapor line. Next, a line is fixed on the pressure-enthalpy chart, corresponding either to a predetermined desired temperature or pressure condition, the selection of which condition in turn depends on such factors as intensity of available heat source, pressure limitations of the equipment, and the like. If a supercritical pressure condition is first determined; the line in question will extend horizontally from the particular pressure value as read on the vertical pressure axis. If a supercritical temperature is first determined; the line in question will be a curved constant temperature line on the chart located to the right of the saturated vapor line. Depending upon which condition, temperature or pressure, is first considered, the corresponding pressure or temperature condition, whichever may be the case, is determined by reading this value from the appropriate scale as determined by the point at which the pre-determined pressure or temperature line intersects the above defined OEL.

A typical working supercritical cycle utilizing $CF_3CH_2Br$ comprises pumping the power fluid to 750 p.s.i.a. and heating the fluid past its critical temperature to 400° F., at which temperature the liquid has an enthalpy designated by $H_7$, which is substantially equivalent to the enthalpy values at $H_2$ and $H_1$, described hereinbefore. The expanding vapors of the vaporized power fluid enter the turbine with an enthalpy of 74.0 B.t.u./lb., designated as $H_5$. The vapors are then expanded through the turbine to 14.5 p.s.i.a. and exit the turbine possessing an enthalpy of 43.5 B.t.u./lb. ($H_{11}$) and a temperature of 81° F. The vapors are then cooled, liquefied in a condenser, returned to the pump and recycled to the boiler as before. The complete cycle is traced on the pressure-enthalpy chart of FIG. 1 by the following lines which connect enthalpy points: $H_1$–$H_7$–$H_5$–$H_{10}$–$H_1$. The efficiency of the cycle may be determined by substituting the appropriate values in Equation I, supra, as follows:

$$\frac{H_5-H_{11}}{H_5-H_1} = \frac{74.0-43.5}{74.0-(-27.2)} = 30.1\%$$

From the above discussion and description of the invention, it will be obvious that the advantageous properties of the power fluid of the invention may be used in conjunction with a variety of well known power recovery systems, thermodynamic cycles and for a variety of well known applications. It will be equally obvious that other variations, cycles and applications may also be readily devised and employed by those skilled in the art, which also may be used to take advantage of those properties of $CF_3CH_2Br$, which make it especially suitable for use as a power fluid. By way of further example, a regenerative system may be employed with a supercritical cycle and binary systems may be employed with either saturated or superheated cycles, alone or in combination with a regenerative system. For these reasons, the invention is not to be limited by any specific or illustrative embodiment, modification or application discussed herein but only by the scope of the appended claims.

We claim:

1. The method for converting heat energy to mechanical energy which comprises vaporizing a fluid comprising 1-bromo-2,2,2,-trifluoroethane, by passing the same in heat exchange relationship with a heat source, and utilizing the kinetic energy of the resulting expanding vapors to perform work.

2. The process of claim 1 in which the expanded vapors are reconverted to liquid and are recycled to pass in heat exchange relationship with the heat source.

3. The process of claim 2 which is carried out employing essentially a saturated cycle.

4. The process of claim 2 which is carried out employing a superheated cycle.

5. The process of claim 2 which is carried out employing a supercritical cycle.

6. The process of claim 2 in which temperatures in the system are permitted to approach, but not exceed, about 500° F.

7. The process of claim 2 in which temperatures in the system are permitted to approach, but not exceed, about 350° F.

8. The process of claim 7 in which the material of construction of the system components is ordinary steel.

9. The method for converting heat energy to mechanical energy which comprises vaporizing a fluid comprising 1-bromo-2,2,2-trifluoroethane, by passing the same in heat exchange relationship with a heat source, utilizing the kinetic energy of the expanding vapors to perform work, reconverting the expanded vapors to liquid and recycling the liquid to the heat source, in which method an essentially saturated cycle is employed, temperatures in the system are not permitted to exceed about 350° F. and in which the material of construction of the system components is ordinary steel.

10. The method for converting heat energy to mechanical energy which comprises vaporizing and superheating a fluid comprising 1-bromo-2,2,2-trifluoroethane, by passing the same in heat exchange relationship with one or more heat sources, utilizing the kinetic energy of the expanding vapors to perform work, condensing the expanded vapors to liquid, utilizing the exhaust or excess heat from the work producing device to raise the temperature of the condensed liquid and recycling the heated condensed liquid to the original heat source, in which method temperatures in the system are not permitted to exceed about 500° F.

References Cited by the Examiner
UNITED STATES PATENTS 3,234,734　2/1966　Buss et al. _____ 60—36

EDGAR W. GEOGHEGAN, *Primary Examiner.*